Aug. 15, 1972     R. HOFFMANN     3,684,620

ELECTRIC HEAT SEALING MACHINE

Filed April 25, 1968

> United States Patent Office 3,684,620
Patented Aug. 15, 1972

3,684,620
ELECTRIC HEAT SEALING MACHINE
Richard Hoffmann, Schillerstrasse 12,
Hechingen, Hohenzollern, Germany
Filed Apr. 25, 1968, Ser. No. 724,068
Claims priority, application Germany, May 22, 1967,
B 92,649
Int. Cl. B29c 27/10; B32b 31/20
U.S. Cl. 156—380                                      1 Claim

ABSTRACT OF THE DISCLOSURE

An apparatus for connection of plane elements of natural or synthetic material which comprises a housing and a heat source for activating of the glue layer on a workpiece and secured to the housing. A holding down member and an electrode are provided, both being movable perpendicularly towards one of said workpiece and workpiece support, respectively, and the electrode cooperates with the hold-down member. The abutment edge portion of the holding-down member as well as the welding part of the electrode are substantially complementary to the overlapping edge parts of two workpieces.

---

The present invention relates to an apparatus for a seamless connection of leather parts and the like, in general, and to an apparatus for connection of plane elements of natural or synthetic material, particularly of natural leather and synthetic leather and the like, in particular.

It is known in the shoe manufacture to sew together individual parts, for instance, of shoe uppers or lining shaft parts to a complete plane unit. Within the progressing rationalization in the production, the auxiliary industry prepares suitably already the material extensively for particular working processes. Thus, now, leather and other natural and synthetic materials are delivered pregummed, the glue layer of which can be made adhesive after corresponding activation. It is also known to connect shoe shaft parts together in a glue-welding process. For this purpose, the parts to be glued together, the edge portions of which overlap each other, are disposed over each other in an arrangement, similar to that in a sewing machine, according to which between two electrodes the heat impinging the glue material activating the latter. It is of a drawback thereby, that the prevailing overlapping part must be passed by on the electrodes, so that the time consumpion for the passing of the workpiece for the seamless connection is comparatively great.

Starting with the status of the prior art, it has been found that the use of work pieces, for instance, shoe shaft or lining parts, etc., which have already a layer of glue material in combination with suitable heat sources permit a fast, simple, and last but not least extremely exact connection of two workpiece parts of leather and the like, as long as the heat source is correspondingly formed relative to the prevailing overlapping edge.

It is one object of the present invention to provide an apparatus for seamless connection of leather parts and the like, wherein for connection of plane elements of natural or synthetic material, which apparatus consists of a heat source for activating the glue material on work pieces whereby the apparatus includes a holding-down member movable perpendicularly to work piece and the workpiece support, respectively, and at least one electrode movable in similar manner and cooperating with the holding-down member, whereby the abutment edge parts of the holding-down member, as well as the welding part of the electrode are complementary with the overlapping edge parts of two workpieces.

In a preferred embodiment, two oppositely disposed electrodes are coordinated to the holding-down member, whereby always the electrodes and the side parts of the holding-down member relative to each other and relative also to the side edges of the workpieces to be connected are substantially complementary. The holding-down member is thereby the holding means for one work-piece part and an abutment for the other work piece part to be connected.

Suitably, the electrodes are electrically heatable metal bodies, the temperature of which can be selectively controlled. It is, of course, also feasible to use, instead of resistance heated metal bodies, a high-frequency heating known per se. The holding-down member and the electrode are pneumatically or hydraulically movable towards and from the supporting face by means of piston rods, whereby the holding-down member and the electrodes are operable per se.

Advantageously the electrodes and the holding-down member are secured exchangeably to the piston rods, so that these work tools can be adjusted to the work pieces and to their contours to be connected by exchange, respectively.

With these and other objects in view, which will become apparent in the following detailed description, the present invention will be clearly understood in connection with the accompanying drawing, in which.

Figure 1:
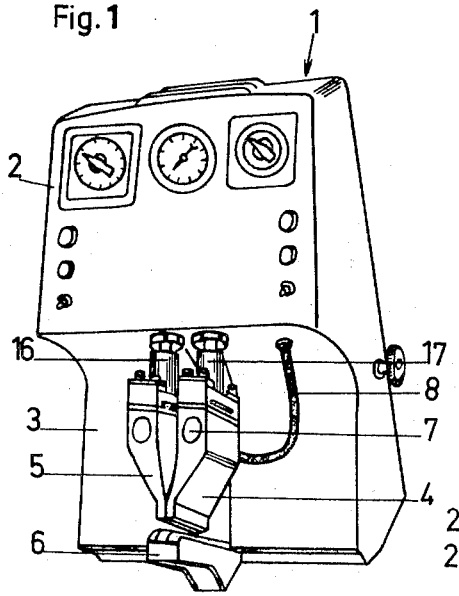
FIG. 1 is a perspective view of an apparatus with a holding-down member and an electrode.

Referring now to the drawing, and in particular to FIG. 1 the apparatus comprises a housing 1 consisting of an upper housing part 2 and a lower housing part 3. In the upper housing part 2 operating knobs and an indicating instrument are provided, as well as covered by the top cover and not visible are arranged the suspension and operation device, such as pressure cylinders, etc., for the electrode 4 and the holding-down member 5. At the lower end of the lower housing part 3, a support 6 is provided for the edge parts of the workpieces to be connected. The electrode 4 has a heating body 7 which is connectable with a feeding source by means of a connection 8. The electrode 4 and the holding-down member 5 are releasably secured to piston rods 16 and 17 and are axially movable by means of the latter to the support and away from the latter hydraulically or pneumatically.

Figure 2:
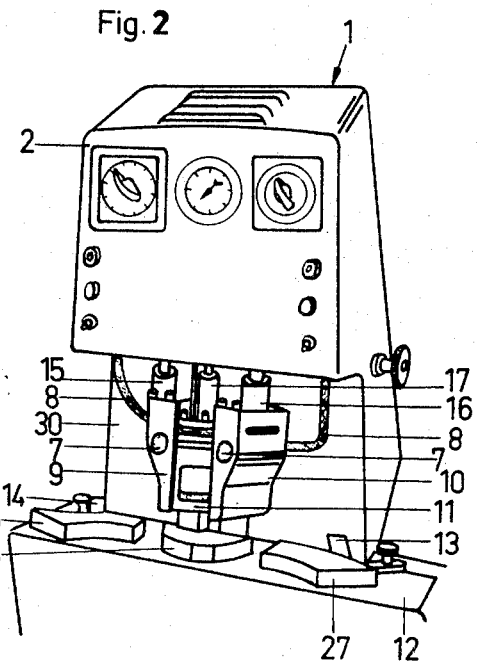
FIG. 2 is a perspective view of an apparatus with a hold-down member and two electrodes.

Referring now again to the drawing, and in particular to FIG. 2, the apparatus is substantially designed in the same manner as that shown in FIG. 1 and has two electrodes 9 and 10, which are disposed on both sides of a holding-down member 11. At the lower end of the lower housing part 3 is arranged a work piece supporting table 12, on which holding abutments 13 and 14 are adjustably secured in their prevailing positions. Here also the electrodes 9 and 10 and the holding-down member 11 are releasably secured to piston rods 15, 16 and 17, respectively, and positioned over the workpiece supporting table 12 and axially controllably movable to and away from the latter hydraulically or pneumatically.

Figure 3A:
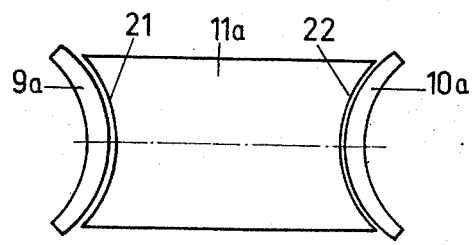
FIG. 3a is a bottom plan view of a holding-down member with two electrodes.
Figure 3B:
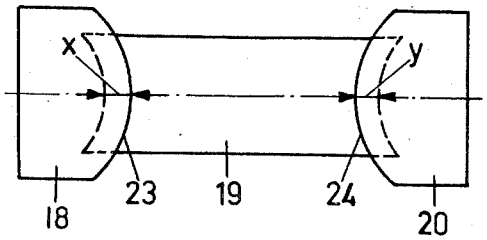
FIG. 3b is a schematic top plan view of two workpieces to be connected.

Referring now again to the drawings, and in particular to FIGS. 3a and 3b, FIG. 3a showing a bottom plan view of electrodes 9a and 10a with a holding-down member 11a and FIG. 3b showing the workpieces 18, 19 and 20, which demonstrate the complementary arrangement of the workpieces and their side edges, respectively, relative to the workpiece edge parts to be connected. Here it is readily recognized, that the holding-down member 11a is complementary at its abutment edge portions 21 and 22, with the contours 23 and 24 of the two work pieces 18 and 20, whereby the width of the holding-down member 11a relative to the width of the lower workpiece 19 determines the welding edge width x and y, so that by adjustment of both widths, holding-down member 11a and workpiece 19, any desired width x and y, respectively, can be obtained. Accordingly, also the electrodes 9a and 10a cooperating with the holding-down member 11a are substantially adjusted in their forming at the lower supporting part, and thereby the welding part of the forming of the abutment edge portions 21 and 22. Logically, their width at the welding part corresponds about with the width of the welding edge x and y.

The operation of the devices is as follows:

For the welding, two workpieces precut correspondingly at the connecting sides are removed each from a staple, whereby one is retained with the connecting side below the holding-down member 5 (FIG. 1) on the support 6. Thereafter, the holding-down member is operated, which moves to the support 6 and the workpiece, and the latter is retained thereon. Now, the other workpiece part is retained on the abutment side and the abutment edge portion 22, respectively, of the holding-down member, whereby the workpiece edge of the hold-down workpiece overlapping the holding-down member is covered up, so that both workpiece edge parts are disposed above each other in welding edge width. Upon corresponding switching control of the electrodes, the latter moves now to the overlapping workpiece edge parts which are disposed above each other, whereby by activation of the glue material layer on the workpieces, the latter are weld-connected together. Upon lifting of the holding-down member and the electrode, the connected workpieces are now removed from the apparatus.

For the simultaneous connection of three workpiece parts (FIG. 2), three workpiece staples 25, 26, 27 constituting the workpiece layers are disposed on the workpiece supporting table 12. The two outer staples 25 and 27 are retained by holding abutments 13 and 14 in a corresponding desired position, while the center staple 26 is correspondingly centered relative to the holding-down member 11 and is disposed below the latter. The first working step is started again from the holding-down member 11, which moves towards the workpiece staple 26 and retains the latter on the workpiece supporting table 12. Thereafter, a workpiece 18 and 20 is removed from both sides from workpiece staples 25 and 27 and moved up to the abutment edge parts sides of the holding-down member 11. This lifting and moving can be performed manually or also automatically with suction devices known per se, which lift the workpieces from the staples and displace and remove the same accordingly. As indicated in FIGS. 3a and 3b, also the workpiece edges overlapping on both sides on the holding-down member 11a and overlapping the workpiece 19 are covered up by the edges in welding edge width x and y. As soon as the workpiece edge parts on both sides overlap each other in an opposite arrangement, the electrodes 9a and 10a move down adjacent therto and weld in one working step the workpieces 18, 19 and 20 into a unitary workpiece.

It should still be mentioned that the electrodes 9 and 10 are adjustable and securable relative to each other perpendicularly to the axis as to their distance.

While I have disclosed one embodiment of the present invention, it is to be understood that this embodiment is given by example only and not in a limiting sense, the scope of the present invention being determined by the objects and the claim.

I claim:

1. An apparatus for connection of plane elements of natural or synthetic material, comprising a housing including a workpiece support means for receiving thereon workpieces to be heat sealed, a heat source means for activating of the glue layer on a workpiece, a hold down means, means for lowering said hold down maens into a clamping position, said hold down means for serving as an abutment for an edge of an upper overlapping workpiece on a lower workpiece and for simultaneously serving to hold down said lower workpiece when said hold down means is lowered into said clamping position, at least one electrode means operatively connected to said housing and having said heat source, means for lowering said electrode means into an operative workpiece contacting position, said electrode means and said hold down means each being separately positioned and movable relative to each other in the direction of said workpiece support by said lowering means, respectively, said electrode means cooperating with said hold down means to be positioned on said upper overlapping workpiece adjacent said hold down means when the latter is holding down said first workpiece, and said electrode in this position for commencing heat sealing of said workpieces and completing a heat sealing together of said upper and lower workpieces, means for raising said hold down means and means for raising said electrode means from the heat sealed workpieces, said at least one electrode means comprises two oppositely disposed electrodes which are coordinated to said hold down means disposed on opposite sides thereof, said electrodes and said hold down means are each separately mounted, means for lowering each of said electrodes as well as said hold down means separately relative to said workpiece support means, each of said electrodes being positioned against opposite overlapping portions of said upper workpiece on said lower workpiece and adjacent said hold down means when the latter is holding down said lower workpiece, and in this position for commencing heat sealing of said workpiece and completing heat sealing together at said upper and lower work pieces of both opposite ends, and means for raising said electrodes and said hold down means from said heat sealed workpieces.

References Cited

UNITED STATES PATENTS

| | | | |
|---|---|---|---|
| 2,479,375 | 8/1949 | Langer | 156—380 |
| 3,172,798 | 3/1965 | Rosenbaum | 156—380 |
| 3,375,777 | 4/1968 | Techtmann et al. | 156—583 |

BENJAMIN A. BORCHELT, Primary Examiner

J. J. DEVITT, Assistant Examiner

U.S. Cl. X.R.

156—272, 583